United States Patent

Eberhardt

[15] 3,652,790

[45] Mar. 28, 1972

[54] SEARCH AND TRACKING TELEVISION SYSTEM AND METHOD

[72] Inventor: Edward H. Eberhardt, Fort Wayne, Ind.

[73] Assignee: International Telephone and Telegraph Corporation, Nutley, N.J.

[22] Filed: Jan. 28, 1970

[21] Appl. No.: 6,630

[52] U.S. Cl. ....................178/6.8, 178/DIG. 6, 178/DIG. 21, 178/7.81

[51] Int. Cl. ........................................H04n 5/22, H04n 7/18

[58] Field of Search ...............178/6.8, 7.81, DIG. 6, DIG. 21

[56] References Cited

UNITED STATES PATENTS 2,490,561 12/1949 Ussler, Jr. .........................178/DIG. 6

3,546,376 12/1970 Crecelius et al. .......................178/6.8

*Primary Examiner*—Robert L. Griffin

*Assistant Examiner*—Richard K. Eckert, Jr.

*Attorney*—C. Cornell Remsen, Jr., Walter J. Baum, Percy P. Lantzy, Philip M. Bolton, Isidore Togut, Charles L. Johnson, Jr. and Hood, Gust, Irish & Lundy

[57] ABSTRACT

A search and tracking television system and method in which a storage-type camera tube is employed for searching a large field of view for a desired target, the image of the field viewed by the storage camera tube being displayed by one gun of a dual beam cathode ray tube. An image dissector-type camera tube is employed for viewing a smaller included field, and ultimately for tracking a desired target, and the image of the smaller field viewed by the image dissector tube is displayed by the other gun of the dual beam cathode ray tube. The image dissector tube is electronically and/or mechanically gimballed selectively to move the image of its field of view on the screen of the dual beam cathode ray tube so as to display the image of a desired target which appears in the field of view of the storage camera tube in the field of the image dissector tube. Once the target image has been so displayed, the image dissector tube is switched to its tracking mode so as to track the target thus acquired in its field of view.

27 Claims, 7 Drawing Figures

INVENTOR
EDWARD H. EBERHARDT
BY Hood, Gust, Irish & Lundy
ATTORNEYS

INVENTOR
EDWARD H. EBERHARDT
BY Hood, Gust, Irish & Lundy
ATTORNEYS

INVENTOR
EDWARD H. EBERHARDT
BY Hood, Gust, Irish + Lundy
ATTORNEYS

INVENTOR
EDWARD H. EBERHARDT
BY Wood, Gust, Irish + Lundy
ATTORNEYS

SEARCH AND TRACKING TELEVISION SYSTEM AND METHOD

BACKGROUND OF THE INVENTION

1. Field of the Invention

This invention relates generally to search and tracking television systems and methods, and more particularly to a system and method employing a storage-type camera tube for large field searching and an image dissector-type camera tube for smaller field search and tracking.

2. Description of the Prior Art

Storage-type television camera tubes, such as the Vidicon and image Orthicon have been employed and are highly satisfactory for high resolution target searching, however, they are not well suited for subsequent tracking of a target since their raster size and scanning rates cannot easily be changed. On the other hand, image dissector camera tubes have been employed and are highly satisfactory for tracking targets in a small field of view, however, they are not suitable for high resolution target acquisition at normally encountered outdoor lumination levels due to their lack of sensitivity and lack of storage capability for large fields of view. A dual camera system employing a storage-type camera tube for large field searching and an image dissector for small field search and then for tracking has not been considered feasible by reason of "boresight hysteresis" which arises by reason of the fact that the two cameras may be at different locations and are not physically bound together.

SUMMARY OF THE INVENTION

In accordance with the invention, it is proposed to eliminate the boresight alignment problem by employing an image dissector as an intermediate, low band width, limited field scanning tube for searching, prior to its employment for tracking the acquired target. Thus, in one embodiment of the invention, a dual beam cathode ray tube is provided with the field viewed by the storage camera tube displayed thereon by one gun, the storage camera tube being suitably gimballed to permit searching of the field of view until a desired target appears therein and on the display screen of the cathode ray tube. The smaller image of the smaller field viewed by the image dissector is simultaneously displayed on portions of the screen of the cathode ray tube by the other gun, the image dissector being electronically and/or mechanically gimballed so that the desired target appears in its field of view and on the display screen, and further to blank out the image of the target viewed by the storage tube. When this has been accomplished, the image dissector is properly aimed at the target initially acquired by a combination of the storage camera tube and the dissector, thus eliminating the boresight problem, and the image dissector may then be switched to its tracking mode.

Thus, in accordance with the broader aspects of the invention, a first camera tube is provided having means for scanning a first field of view and for generating a first video signal in response thereto. A cathode ray display tube is provided having a display screen, and means are provided for simultaneously displaying first and second images on the display screen respectively responsive to the first and second video signals, and for selectively moving at least one of the fields of view with respect to the other thereby to acquire a common target in both fields of view and for simultaneously moving the respective images with respect to the other image on the display screen thereby to superimpose images of the common target appearing in both fields of view.

It is accordingly an object of the invention to provide an improved search and tracking television system.

Another object of the invention is to provide an improved search and tracking television system employing a storage-type camera tube for initial searching and an image dissector-type camera tube for final search and tracking.

A further object of the invention is to provide an improved method of television searching and tracking.

The above-mentioned and other features and objects of this invention and the manner of attaining them will become more apparent and the invention itself will be best understood by reference to the following description of an embodiment of the invention taken in conjunction with the accompanying drawings wherein:

DESCRIPTION OF THE PREFERRED EMBODIMENTS

Figure 1:
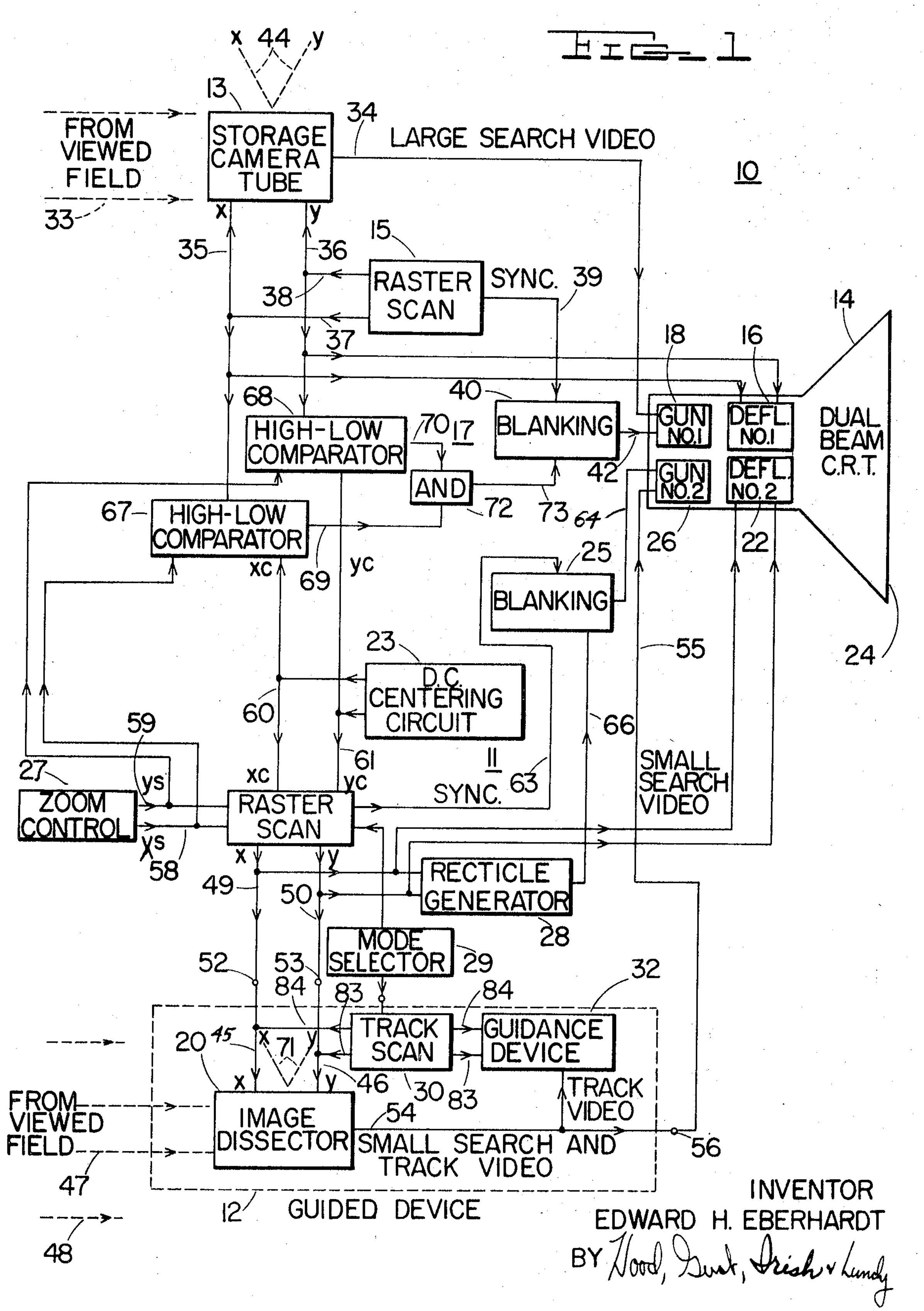
FIG. 1 is a schematic block diagram illustrating one embodiment of the invention.

Referring now to FIG. 1, the search and tracking television system of the invention, generally indicated at 10, includes a base station 11 and a guided device, indicated by the dashed line box 12, the guided device 12 being located at or adjacent the base station 11 during the target search and acquisition operations, but being adapted to be separated therefrom during subsequent tracking of the acquired target. A storage-type camera tube 13, such as a Vidicon or image Orthicon, and a dual beam cathode ray tube 14 are provided at the base station 11, a conventional raster scanning circuit 15 being coupled to the camera tube 13 and to deflection elements 16 of cathode ray tube 14. A blanking system 17, to be hereinafter more fully described, is provided for blanking electron gun 18 of cathode ray tube 14. Another conventional raster scanning circuit 19 is located at the base station 11 coupled to the image dissector tube 20 and the guided device 12, and to deflection elements 22 of cathode ray tube 14. A DC centering circuit 23 is coupled to raster scanning circuit 19 for selectively electronically gimballing image dissector 20 and for simultaneously moving the image provided by the image dissector 20 on display screen 24 of cathode ray tube 14. A conventional blanking circuit 25 is provided for blanking electron gun 26 of cathode ray tube 14. A conventional zoom control circuit 27 is provided coupled to the raster scanning circuit 19 for selectively adjusting the size of the image on display screen 24 provided by image dissector tube 20, and a reticle generator circuit 28 is provided for generating an appropriate reticle for "cross hairs" on the image provided by image dissector 20. A mode selector switch 29 is provided at the base station 11 coupled to raster scanning circuit 19 and to the track scanning circuit 30 in the guided device 12 for switching image dissector 20 from its scanning mode to its tracking mode. Guidance device 32, which does not form a part of the present invention, is provided in the guidance device 12 for guiding the same during the tracking mode in response to the output video signal from the image dissector 20.

Figure 2:
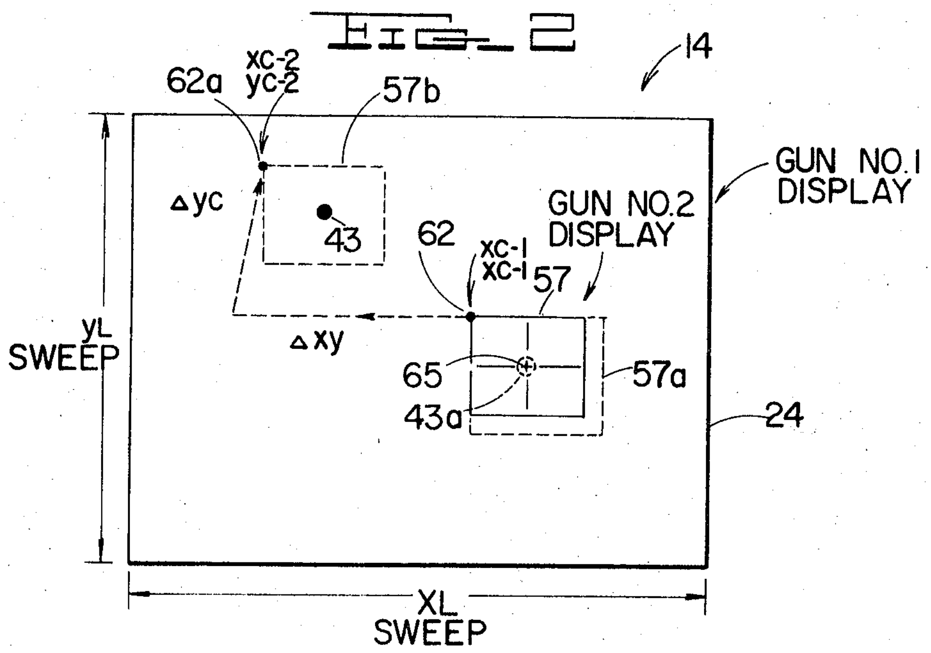
FIG. 2 is a diagram showing the images provided by the storage camera tube and the image dissector displayed on the display screen of the dual beam cathode ray tube employed in the system of FIG. 1.

More particularly, storage camera tube 13 at the base station 11 is arranged to scan a field of view indicated by dashed lines 33 and to provide a video signal in response thereto in its output circuit 34 in response to the application of X and Y sweep voltages applied to its sweep voltage input circuits 35 and 36. Raster scanning circuit 15 has its X and Y output circuits 37 and 38 coupled to sweep voltage input circuits 35 and 36 of camera tube 13 and to deflection elements 16 of dual beam camera tube 14, and video signal output circuit 34 is coupled to electron gun 18 associated with deflection elements 16. Thus, the field 33 viewed by the storage camera tube 13 is scanned in raster fashion and the electron beam generated by electron gun 18 in response to the resulting video signal is simultaneously scanned in raster fashion by deflection elements 16 over the display screen 24 of dual beam cathode ray tube 14. Raster scanning circuit 15 has a sync. signal output circuit 39 coupled to conventional blanking circuit 40 which has its output circuit 42 coupled to electron gun 18 for blanking the electron beam provided thereby during horizontal and vertical retrace, in conventional fashion. Referring additionally to FIG. 2, raster scanning circuit 15 and deflection elements 16 are arranged to scan the beam provided by electron gun 18 over the entire surface of display screen 24 of dual beam cathode ray tube 14 and thus, a desired target appearing within the field 33 viewed by the storage camera tube 13 will appear on display screen 24, as at 43. Storage camera tube 13 may be mechanically gimballed in its X and Y axes, as shown in dashed lines at 44, so as to bring the target image 43 within the field of view 33.

Image dissector tube 20, in response to the application of appropriate sweep voltages to its X and Y sweep voltage input circuits 45 and 46 scans a small field of view, indicated by the dashed lines 47, within a larger field of view, indicated by the dashed lines 48. X and Y sweep voltage output circuits 49 and 50 of raster scanning circuit 19 are coupled by disconnect contacts 52 and 53 to the X and Y sweep voltage input circuits 45 and 46 of image dissector 20. Video signal output circuit 54 of image dissector 20 is coupled to electron gun 26 associated with deflection elements 22 of dual beam cathode ray tube 14 by circuit 55 and disconnect contacts 56. X and Y sweep voltage circuits 49 and 50 of raster scanning circuit 19 are also coupled to deflection elements 22 of dual beam cathode ray tube 14. Thus, during the scanning mode of operation of image dissector 20, the field 47 viewed by image dissector 20 is scanned in raster fashion and the electron beam generated by electron gun 26 in response to the resulting video signal in output circuit 54 is simultaneously scanned in raster fashion by deflection elements 22 on display screen 24. Referring again briefly to FIG. 2, raster scanning circuit 19 and deflection elements 22 are arranged so that the image 57 of the field of view 47 displayed on display screen 24 is substantially smaller than the image of the field of view 33 displayed by gun 18 and deflection elements 16. Zoom control 27 has its XS and YS output circuits 58 and 59 coupled to raster scanning circuit 19 for selectively increasing or decreasing the size of the image displayed on display screen 24 by electron gun 26 and deflection elements 22, as shown by the dashed lines 57*a*.

Selectively adjustable DC centering circuit 23 has its XC and YC output circuits 60 and 61 coupled to raster scanning circuit 19 for selectively positioning image 57 of the field 47 viewed by image dissector 20 on screen 24. It will be readily understood that selective adjustment of the DC centering circuit 23 will result in determination of the starting point 62 of the horizontal and vertical sweep of displayed image 57. Sync. signal output circuit 63 of raster scanning circuit 19 is coupled to blanking circuit 25, which has its output circuit 64 coupled to electron gun 26 for blanking the electron beam provided thereby during horizontal and vertical retrace in conventional fashion. X and Y sweep voltage output circuits 49 and 50 of raster scanning circuit 19 are coupled to reticle generator 28, which has its output circuit 66 coupled to blanking generator 25, thereby to generate reticle or cross-hairs 65 in the displayed image 57 on display screen 24.

Figure 3:
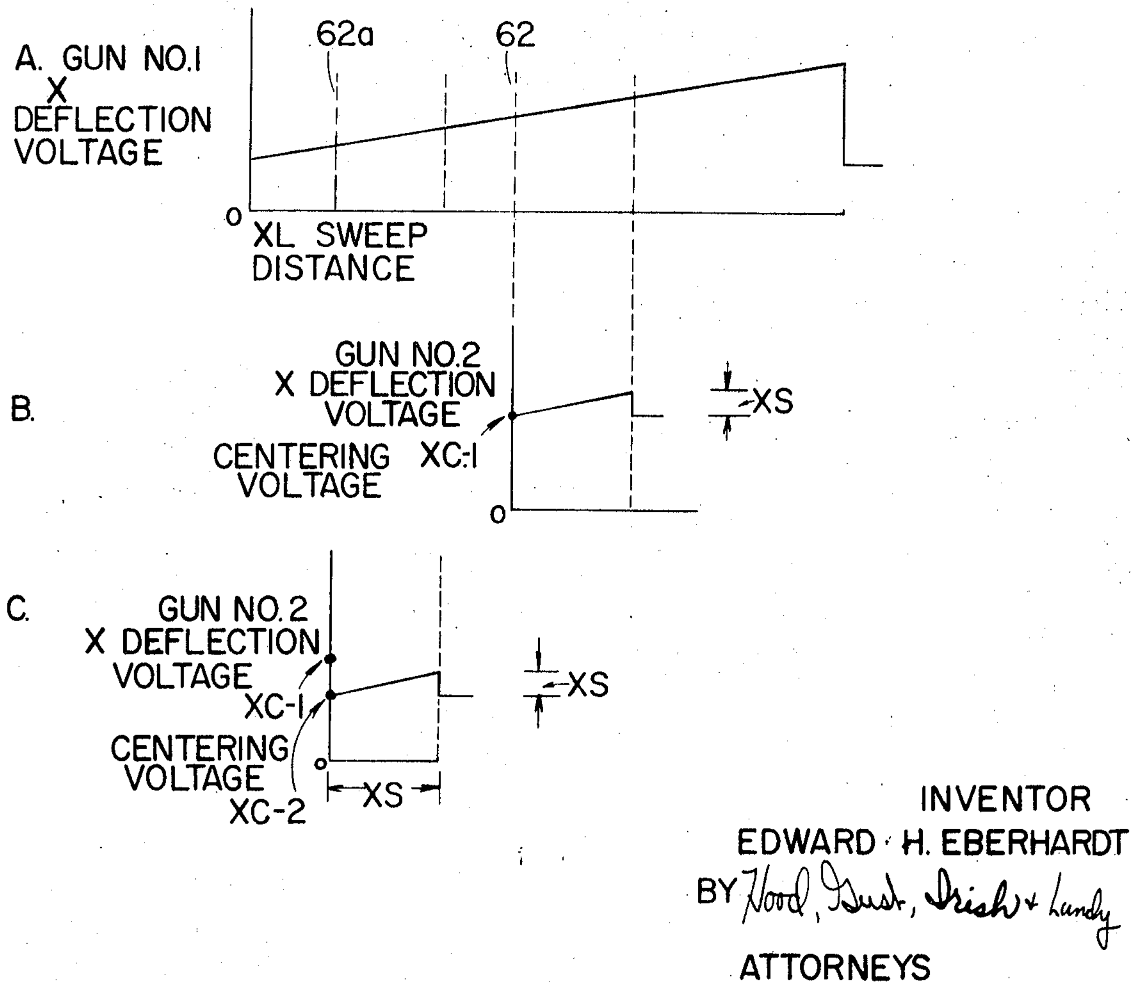
FIG. 3 is a diagram showing the sweep voltages employed for the storage and image dissector camera tubes, and useful in explaining the operation of the system of FIG. 1.

Referring now briefly to FIG. 3, in which the horizontal or X sweep voltages respectively applied to deflection elements 16 and 22 are shown, it will be seen that the X deflection voltage provided by raster scanning circuit 15 will scan the electron beam generated by electron gun 18 in response to the video signal provided by storage camera tube 13 across the entire width or horizontal dimension of display screen 24 of dual beam cathode ray tube 14. Similarly, it is seen that the X deflection voltage provided by raster scanning circuit 19 will scan the electron beam provided by electron gun 26 in response to the video signal provided by image dissector 20 across only a portion of the horizontal dimension of display screen 24. Further, it will be seen that selective adjustment of the XC centering voltage provided by DC centering circuit 23 will determine the starting point 62 for the horizontal deflection of the beam generated by electron gun 26 with respect to the deflection of the beam generated by the electron gun 18. Thus, adjustment of the XC voltage from a level XC-1 to a lower level identified as XC-2 (and similar adjustment of the YC centering voltage provided by centering circuit 23) will move starting point 62 to point 62*a*, thereby moving the displayed image 57, as indicated by the dashed lines 57*b* in FIG. 2. It will further be seen that selective adjustment of the XS reference voltage provided by the zoom control 27 will determine the duration and thus the extent of the X sweep of the electron beam generated by electron gun 26, similar adjustment of the YS reference voltage determining the duration and thus the extent of the Y sweep.

Assuming now that the storage camera tube 13 has been mechanically gimballed to bring the desired target 43 within its field of view, DC centering circuit 23 may then be selectively adjusted electronically to gimbal image dissector 20 simultaneously to move its field of view 47 and its image 57 on display screen 24 until the image of the desired target, indicated by the dashed lines 43*a*, appearing on the displayed image 57, is superimposed on the target image 43, at which point the image dissector 20 is aligned with the desired target so as to permit subsequent switching to the tracking mode. Image dissector 20 may also be mechanically gimballed in its X and Y axes, as indicated in dashed lines at 71, in order to provide initial aiming of the image dissector so that its field of view 47 is generally within the field of view 33 of storage camera tube 13.

Electron gun 26 which provides an electron beam in response to the video signal provided by image dissector 20 may be arranged merely to provide a brighter displayed image 57 on display screen 24. However, it may be desirable to blank the image provided by electron gun 18 in response to the video signal provided by the storage camera tube 13 while it is being scanned over the image 57 provided by deflection of the electron beam from gun 26. In order to provide this blanking, X and Y high-low comparator circuits 67 and 68 are provided having their X and Y blanking output circuits 69 and 70 coupled to AND circuit 72, which has its output circuit 73 coupled to blanking circuit 40. The X high-low comparator circuit 67 compares the x sweep voltage applied to the storage camera tube 13 with the X sweep voltage applied to the image dissector 20 and provides a signal in its output circuit 69 when the X sweep voltage applied to storage camera tube 13 is above the XC centering reference voltage provided by centering circuit 23 and below the maximum level of the X sweep voltage applied to image dissector 20, as determined by the XS reference voltage provided by zoom control 27. Thus, the X sweep voltage output circuit 37 of raster scanning circuit 15, the XS output circuit 58 of zoom control 27, and the XC output circuit 60 of DC centering circuit 23 are coupled to the X high-low comparator circuit 67. The Y high-low comparator 68 functions in similar fashion with the Y sweep voltage output circuit 38 of raster scanning circuit 15, and the YS and YC output circuits 59 and 61 of zoom control 27 and centering circuit 23 being coupled thereto.

Figure 4:
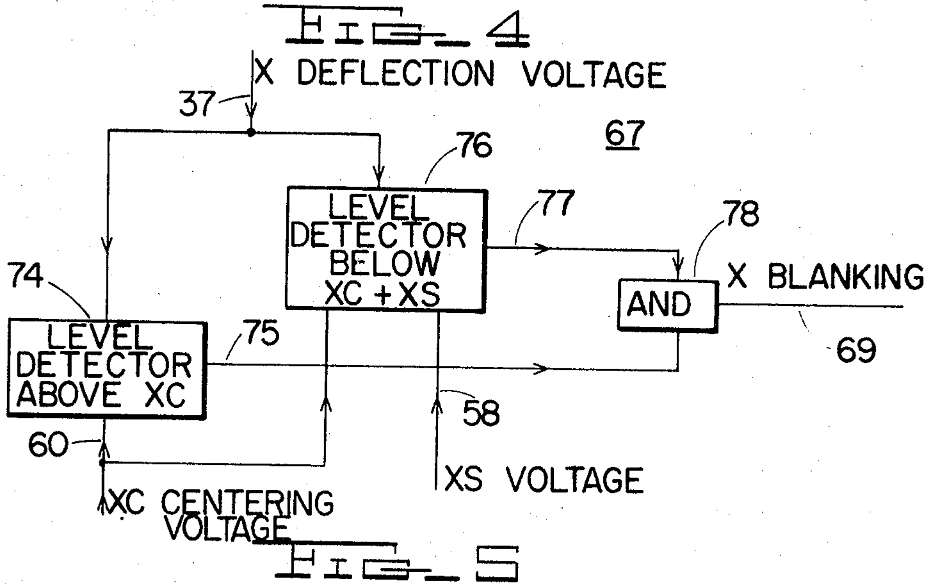
FIG. 4 is a fragmentary schematic block diagram further illustrating the system for blanking the image provided by the storage camera tube.

Referring additionally to FIG. 4, the X high-low comparator circuit 67 may comprise a conventional level detector 74 coupled respectively to the X deflection voltage output circuit 37 and the XC centering voltage output circuit 60 to provide in its output circuit 75 a signal when the X deflection voltage is above the XC centering voltage determined by centering circuit 23. Another conventional level detector 76 is provided coupled to the X deflection voltage output circuit 37 and to the XS and XC output circuits 58 and 60 for providing in its output circuit 77 a signal when the X deflection voltage is below the sum of the XC and XS voltages respectively determined by centering circuit 23 and zoom control 27. It will be recalled that the XC reference voltage provided by centering circuit 23 determines the starting point 62 of the X sweep of the image 57 provided by image dissector 20, while the XS reference voltage provided by zoom control 27 determines the termination point of the sweep. Output circuit 75 and 77 of level detectors 74 and 76 are coupled to AND circuit 78, which has its X blanking output circuit 69 coupled to AND circuit 72 (FIG. 1).

Figure 5:
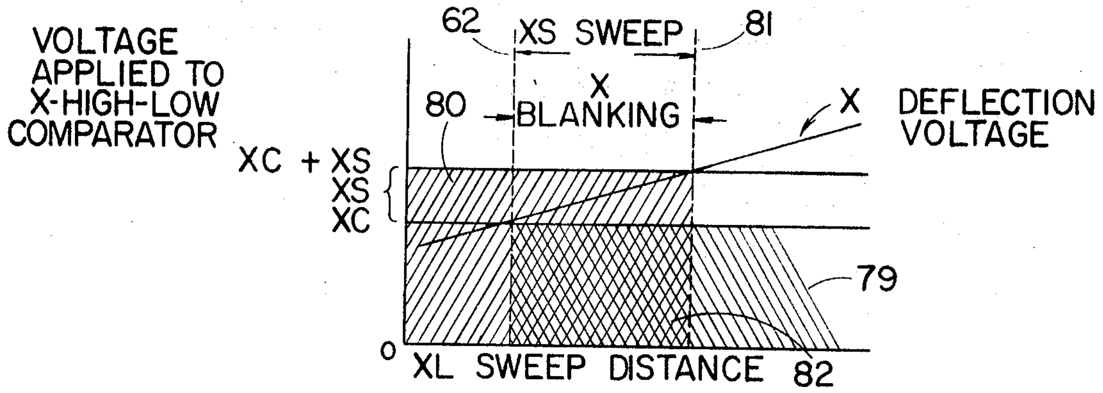
FIG. 5 is a sweep voltage diagram useful in explaining the operation of the system of FIG. 4.

Referring additionally to FIG. 5, it will be seen that when the X deflection voltage applied to storage camera tube 13 is below the level of the XC reference voltage provided by centering circuit 23, no signal will be provided in output circuit 75, however when the X deflection voltage reaches and goes above the XC reference voltage, as indicated by the dashed line 62, an output signal will be provided, as indicated by the cross-hatching 79. Similarly, so long as the level of the X deflection voltage is below the sum of the XC and XS reference voltages, an output signal will be provided in output circuit 77 of level detector 76, as indicated by the cross-hatching 80, however, as soon as the X deflection voltage equals and goes above the maximum value of the XS sweep voltage, as indicated by the dashed line 81, the signal in output circuit 77 will terminate. It will thus be seen that during the duration of the XS sweep of image dissector 20, as shown between the dashed lines 62 and 81, output signals will be provided in both of the output circuits 75 and 77 of level detectors 74 and 76, as shown by the cross-hatching 82, thus providing an X blanking signal in output circuit 69 of the AND gate 78. It will be readily seen that the Y high-low comparator 68 may include comparable level detectors for providing output signals when the Y deflection voltage applied to storage camera tube 13 is above the YC reference voltage provided by centering circuit 23 and below the sum of the YC and YS reference voltages respectively provided by the centering and zoom control circuits 23, 27. Thus, it will be seen that a signal will be provided in output circuit 73 of AND gate 72 any time the beam provided by gun 18 in response to the video signal provided by storage camera tube is being scanned over the image 57 provided by image dissector 20, application of the signal in output circuit 73 to blanking circuit 40 thus blanking the beam provided by gun 18 when the large image provided by storage camera tube 13 overlaps the small image 57 provided by image dissector 20.

X and Y deflection voltage output circuits 83 and 84 of the tracking scan circuit 30 are respectively coupled to the X and Y sweep voltage input circuits 45 and 46 of image dissector 20 and to the guidance device 32, output circuit 54 of image dissector 20 also being coupled to the guidance device 32. The mode selector switch 29 is coupled to the raster scanning circuit 19 and to the tracking scanning circuit 30 by disconnecting contact 91. Thus, when the target images 43, 43*a* appearing on display screen 24 have been superimposed as above-described, with the image dissector 20 thus being properly aimed at the desired target, mode selector switch 29 may be actuated in suitable fashion to actuate the tracking scanning circuit 30 and the guided device 12 separated from the base station 11, the disconnect contacts 52, 53, 56 and 91 permitting such separation.

Figure 6:
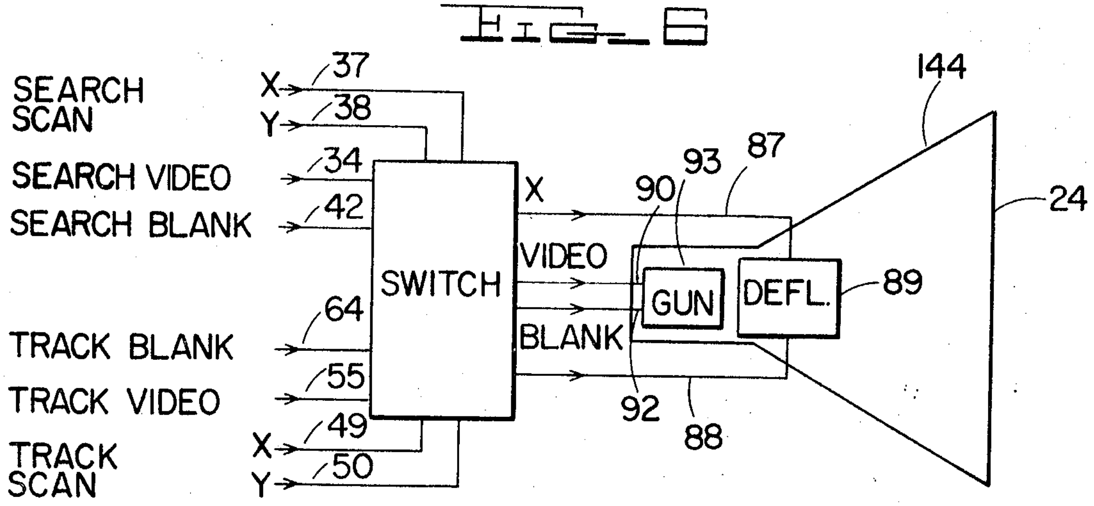
FIG. 6 is a fragmentary schematic block diagram illustrating another embodiment of the invention.

Referring now to FIG. 6, in which like elements are indicated by like reference numerals, a conventional single gun cathode ray tube 144 may be employed rather than the dual beam cathode ray tube 14 of FIG. 1 by employing a high speed switch 86 for alternatively coupling the video signal and deflection voltage circuits associated with storage camera tube 13, and the video signal and deflection voltage circuits associated with image dissector 20 to the electron gun and deflection elements of tube 144. Thus, high speed electronic switch 86 alternately couples the X and Y sweep voltage output circuits 37, 38 of raster scanning circuit 15 and the X and Y sweep voltage output circuits 49 and 50 of raster scanning circuit 19 to X and Y output circuits 87 and 88 respectively coupled to deflection elements 89 of cathode ray display tube 144. Similarly, switch 86 alternately couples the video signal output circuits 34 and 55 of storage camera tube 13 and image dissector 20, and the blanking output circuits 42 and 64 to the video and blanking signal input circuits 90, 92 of electron gun 93 of cathode ray tube 144.

Figure 7:
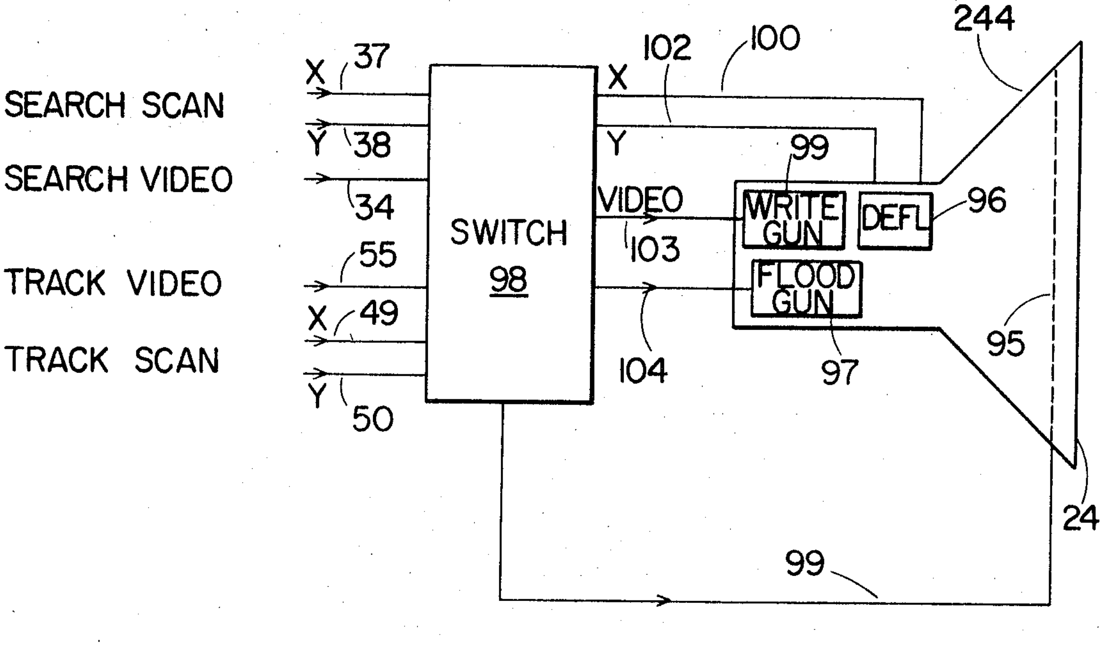
FIG. 7 is a schematic block diagram illustrating yet another embodiment of the invention.

Referring now to FIG. 7 in which like elements are still indicated by like reference numerals, a signal-to-image storage display tube 244 may be employed instead of the dual beam cathode ray tube 14 of FIG. 1, this arrangement permitting elimination of the blanking system 17. Here, storage display tube 244 is conventionally provided with a writing electron gun 94 which directs a high velocity writing electron beam toward storage screen 95, the writing beam being scanned over storage screen 95 by deflection elements 96. A flood electron gun 97 is provided which directs a low velocity flood beam of electrons toward storage screen 95, the flood electrons passing through the storage screen 95 and being modulated by the charge pattern thereon to provide the resultant optical image on display screen 24.

Here, switch 98 first couples the X and Y sweep voltage output circuits 37, 38 of raster scanning circuit 15 to the X and Y output circuits 100 and 102 coupled respectively to deflection elements 96, and at the same time couples video signal output circuit 34 from storage camera tube 13 to output circuit 103 coupled to the writing gun 94, thereby to write the image of the field of view 33 provided by storage camera tube 13 on the charge storage screen 95. Next, switch 98 coupled the X and Y sweep voltage output circuits 49, 50 of raster scanning unit 19 to the X and Y circuits 100, 102 of deflection elements 96 and video signal output circuit 55 of image dissector 20 to video signal circuit 103 of writing gun 94 thereby to write the image 57 provided by the image dissector 20 on the charge storage screen 95, writing of image 57 over the previously written image from storage camera tube 13 erasing that previously written image. Finally, switch 98 energizes circuit 104 to actuate flood gun 97 and circuit 99 to apply the appropriate voltage to charge storage screen 95, as is well known in the art, thereby to readout the composite image onto the display screen 24.

It will now be seen that the system and method of the invention not only eliminates the boresight problem previously encountered in dual camera systems, but further permits the employment of a high sensitivity storage camera tube for target acquisition together with utilization of the excellent tracking capabilities of image dissectors. It will be seen that since the target acquisition storage camera tube is permanently located at the base station 11, the more expensive storage camera tube is not only preserved for further use, but also is protected from heat and shock.

While there have been described above the principles of this invention in connection with specific apparatus, it is to be clearly understood that this description is made only by way of example and not as a limitation to the scope of the invention.

What is claimed is:

1. In a search and tracking television system: a first camera tube having means for scanning a first field of view and for generating a first video signal in response thereto; a second camera tube having means for scanning a second field of view smaller than said first field of view and for generating a second video signal in response thereto; a cathode ray display tube having a display screen; means for simultaneously displaying first and second images on said display screen respectively responsive to said first and second video signals; and means for selectively moving at least one of said fields of view with respect to the other thereby to acquire a common target in both fields of view and for simultaneously moving the respective image with respect to the other image on said display screen thereby to superimpose images of said common target appearing in both said fields of view.

2. The system of claim 1 wherein said moving means includes means for gimballing at least one of said camera tubes.

3. The system of claim 1 wherein said moving means includes means for mechanically gimballing said first camera tube thereby to move said first field of view.

4. The system of claim 1 wherein said moving means includes means for mechanically gimballing said second camera tube thereby to move said second field of view.

5. The system of claim 1 wherein said second camera tube includes electron beam deflection means for scanning said second field of view within a larger field of view, and said moving means includes means acting upon said deflection means for moving said second field of view with respect to said larger field of view thereby to bring said target into said second field of view.

6. The system of claim 1 wherein said means for simultaneously displaying said first and second images includes electron gun means in said display tube for generating an electron beam in response to said second video signal and means for deflecting said electron beam thereby to scan said second image on said display screen, and said moving means includes means acting upon said deflection means for selectively moving said second image with respect to said first image on said display screen.

7. The system of claim 1 wherein said means for simultaneously displaying said first and second images comprises first and second electron gun means in said display tube for respectively generating first and second electron beams in response to said first and second video signals, and first and second means for respectively deflecting said first and second electron beams thereby to scan said images on said display screen.

8. The system of claim 7 further comprising first and second raster scanning means respectively coupled to said first and second deflecting means for scanning said first and second electron beams in raster fashion, said moving means including selectively adjustable centering circuit means coupled to said second scanning means for selectively moving said second image with respect to said first image on said display screen.

9. The system of claim 8 further comprising means coupled to said first gun means and to said second scanning means for blanking said first electron beam when the same is being scanned over said second image.

10. The system of claim 1 wherein said means for simultaneously displaying said first and second images includes electron gun means in said display tube for generating an electron beam and means for deflecting said beam thereby to scan an image on said display screen.

11. The system of claim 10 further comprising means for coupling said first video signal to said electron gun means, raster scanning means and means for coupling the same to said deflecting means for scanning said electron beam in raster fashion, and means coupled to said gun means for blanking the electron beam which is response to said first video signal while the same is being scanned over said second image.

12. The system of claim 10 further comprising switching means for alternately coupling said first and second video signals to said gun means.

13. The system of claim 12 further comprising first and second raster scanning means for said first and second video signals, said switching means alternately coupling said first and second scanning means to said deflecting means.

14. The system of claim 10 wherein said display tube is a signal-to-image storage tube having storage means therein, said electron beam being scanned on said storage means thereby to store an electron image therein, said displaying means further including flood gun means in said display tube for directing a flood beam of electrons toward said storage means thereby to provide an optical image on said display screen, and further comprising switching means for alternately applying said first and second video signals to said first-named gun thereby to store electron images respectively responsive thereto on said storage means, and for energizing said flood gun means and storage means to display the stored images.

15. The system of claim 1 wherein said first camera tube is of the storage type and said second camera tube is of the image dissector type.

16. The system of claim 15 wherein said first camera tube includes electron beam deflection means for scanning said first field of view, said second camera tube including electron beam deflection means for scanning said second field of view within a larger field of view; said displaying means including first and second electron gun means for respectively generating first and second electron electron beams in response to said first and second video signals, first and second means for respectively deflecting said electron beams, and first and second raster scanning means respectively coupled to said beam deflection means of said first and second camera tubes for generating said first and second video signals in raster fashion, said first and second raster scanning means being respectively coupled to said first and second deflecting means for scanning said first and second electron beams in raster fashion on said display screen; said moving means including selectively adjustable centering circuit means coupled to said second raster scanning means for selectively moving said second image with respect to said first image on said display screen, and for simultaneously moving said second field of view with respect to said larger field of view thereby to bring said target into said second field of view.

17. The system of claim 16 further comprising means coupled to said first gun for blanking said first electron beam when the same is being scanned over said second image.

18. The system of claim 17 wherein said blanking means is coupled to said first raster scanning means and to said centering circuit means and is responsive thereto.

19. The system of claim 18 further comprising means coupled to said second raster scanning means for selectively varying the size of said second field of view and second image.

20. The system of claim 19 wherein said first and second raster scanning means respectively provide first and second X and Y deflection voltages; said centering control means providing first X and Y reference voltages for respectively locating the X and Y starting points of the scanning of said second field of view and second image, respectively; said varying means providing second X and Y reference voltages for respectively determining the duration of said second X and Y deflection voltages; said blanking means comprising means for comparing the first X deflection voltage with the first and second X reference voltages, and means for comparing the first Y deflection voltage with the first and second Y reference voltages.

21. The system of claim 16 further comprising means coupled to said second gun for providing a reticle in said second image.

22. In a method of television search and tracking, the steps of: scanning a first field of view with a first camera tube and generating a first video signal in response thereto; scanning a second field of view smaller than said first field of view with a second camera tube and generating a second video signal in response thereto; simultaneously displaying first and second images on a display screen respectively responsive to said first and second video signals; and selectively moving at least one of said fields of view with respect to the other thereby to acquire a common target in both fields of view and simultaneously moving the respective image with respect to the other image on said display screen to superimpose images of said common target appearing in both said fields of view.

23. The method of claim 22 wherein said second field of view is scanned within a larger field of view, and wherein said moving step includes moving said second field of view within said larger field of view.

24. The method of claim 22 comprising the further step of blanking that part of said first image which overlaps said second image on said display screen.

25. The method of claim 22 wherein said displaying step comprises applying said first video signal to a first electron gun and scanning the electron beams provided thereby in raster fashion on said screen thereby to provide said first image, and applying said second video signal to a second electron gun and scanning the electron beam provided thereby in raster fashion on said screen thereby to provide said second image; wherein said second field of view is scanned within a larger field of view; and wherein said moving step comprises moving said second image on said screen with respect to said first image and simultaneously moving said second field of view within said larger field of view thereby to bring said target into said second field of view.

26. The method of claim 25 comprising the further steps of blanking the electron beam provided by said first gun while the same is being scanned over said second image.

27. The method of claim 25 wherein said first camera tube is of the storage type and said second camera tube is of the image dissector type.

* * * * *